(12) United States Patent
Mitsui

(10) Patent No.: US 8,160,349 B2
(45) Date of Patent: Apr. 17, 2012

(54) PATTERN SHAPE EVALUATION METHOD, PROGRAM, AND SEMICONDUCTOR DEVICE MANUFACTURING METHOD

(75) Inventor: Tadashi Mitsui, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 986 days.

(21) Appl. No.: 11/785,781

(22) Filed: Apr. 20, 2007

(65) Prior Publication Data

US 2008/0138916 A1    Jun. 12, 2008

(30) Foreign Application Priority Data

Apr. 26, 2006   (JP) .................................. 2006-122159

(51) Int. Cl.
  *G06K 9/00* (2006.01)
  *G06K 9/46* (2006.01)
  *G06K 9/68* (2006.01)
(52) U.S. Cl. ........ 382/145; 382/199; 382/203; 382/218; 382/144
(58) Field of Classification Search .................. 382/144, 382/199, 203, 218
See application file for complete search history.

(56) References Cited

U.S. PATENT DOCUMENTS

| | | | |
|---|---|---|---|
| 6,647,147 B1 * | 11/2003 | Miyano | 382/199 |
| 6,768,958 B2 * | 7/2004 | Ivanovic et al. | 702/94 |
| 6,868,175 B1 | 3/2005 | Yamamoto et al. | |
| 7,305,106 B2 * | 12/2007 | Sumitomo et al. | 382/103 |
| 7,412,671 B2 * | 8/2008 | Ito et al. | 716/4 |
| 7,449,689 B2 * | 11/2008 | Nagatomo et al. | 250/310 |
| 7,702,157 B2 * | 4/2010 | Mitsui | 382/199 |
| 2003/0059104 A1 * | 3/2003 | Mitsui | 382/145 |
| 2004/0181361 A1 * | 9/2004 | Ikeda et al. | 702/159 |
| 2005/0086618 A1 * | 4/2005 | Ito et al. | 716/4 |
| 2005/0146714 A1 | 7/2005 | Kitamura et al. | |

FOREIGN PATENT DOCUMENTS

| | | |
|---|---|---|
| JP | 4-179133 | 6/1992 |
| JP | 9-304032 | 11/1997 |
| JP | 10-111108 | 4/1998 |
| JP | 2002-353280 | 12/2002 |
| JP | 2005-98885 | 4/2005 |

OTHER PUBLICATIONS

Notice of Reasons for Rejection issued by the Japanese Patent Office in Japanese Patent Applications No. 2006-122159, mailed Aug. 12, 2011, 2 pgs.
Notification of Reasons for Rejection issued by the Japanese Patent Office on Feb. 3, 2012, for Japanese Patent Application No. 2006-122159, and English-language translation thereof.

* cited by examiner

*Primary Examiner* — Bhavesh Mehta
*Assistant Examiner* — Utpal Shah
(74) *Attorney, Agent, or Firm* — Finnegan, Henderson, Farabow, Garrett & Dunner, L.L.P.

(57) ABSTRACT

A pattern shape evaluation method comprising detecting an edge of an evaluation target pattern from an image of the evaluation target pattern to output the edge as a first edge, detecting an edge of a reference pattern from an image of the reference pattern to output the edge as a second edge, performing a relative scan of the first edge and the second edge to superpose the first edge onto the second edge, and outputting a resulting edge as a third edge, calculating a characteristic amount indicating characteristics of the third edge from the third edge, and deriving a characteristic amount function which provides the characteristic amount against relative coordinates in the relative scan and comparing the characteristic amount function with a preset value to judge whether or not the evaluation target pattern is good.

15 Claims, 5 Drawing Sheets

PATTERN SHAPE EVALUATION METHOD, PROGRAM, AND SEMICONDUCTOR DEVICE MANUFACTURING METHOD

CROSS REFERENCE TO RELATED APPLICATION

This application claims benefit of priority under 35USC §119 to Japanese patent application No. 2006-122159, filed on Apr. 26, 2006, the contents of which are incorporated by reference herein.

BACKGROUND OF THE INVENTION

1. Field of the Invention

The present invention relates to a pattern shape evaluation method, a program, and a semiconductor device manufacturing method.

2. Related Background Art

In evaluating the shape of a pattern, a method is widely employed in various industrial fields in which a reference pattern is prepared as a pattern serving as an evaluation standard for an evaluation target pattern and the shape of the pattern is evaluated using a difference between the reference pattern and the evaluation target pattern as an index. For example, in the evaluation of a semiconductor device pattern, whether or not a processed shape of the device pattern is good is judged by use of a scanning electron microscope (SEM) image as an evaluation image of the pattern and by use of design data as the reference pattern.

In particular, in order to deal with complicated pattern shapes, another method has been proposed which comprises generating a tolerance of a pattern as CAD data, reading the tolerance and then superposing the tolerance on design data to display a tolerance shape pattern targeted for measurement, and superposing edge data for the obtained tolerance shape pattern onto edge data for an evaluation target pattern to judge whether or not the pattern is good (e.g., Japanese Patent Laid Open (kokai) 2005-098885).

To achieve the method described in Japanese Patent Laid Open (kokai) 2005-098885, it is essential to establish a method of generating a tolerance shape pattern effective in the evaluation of the pattern shape as well as a method of accurately superposing the tolerance shape pattern on the edge data. To this end, the document described above has also proposed the provision of the tolerance shape pattern with, in addition to the width and area of a target pattern, the distance from a corner of the target pattern, etc., an upper limit value and a lower limit value which correspond to one of: the distance from at least one side of a contact pattern to one side of a wiring line pattern parallel to the one side of the contact pattern when the contact pattern is connected to the wiring line pattern; and the distance between the wiring line pattern and the contact pattern when the contact pattern is formed adjacently to the wiring line pattern. This enables the generation of a detailed tolerance shape pattern adapted to the characteristics of a device (refer to the tolerance shape pattern in FIG. 3 of this document).

However, the method described in the above document has a disadvantage that much labor is required in the generation of the tolerance shape pattern. The file size of the CAD data incorporating tolerance data runs up to about three times that of ordinary CAD data, and there is thus a problem of an increase in computer resources necessary to save and expand the file. The method described in the above document has another problem that an accurate evaluation of the shape of the evaluation target pattern is not enabled only by the design data for a pattern within a layer where the evaluation target pattern is present, in a product such as a semiconductor device having a layer structure.

SUMMARY OF THE INVENTION

According to a first aspect of the present invention, there is provided a pattern shape evaluation method comprising:
detecting an edge of an evaluation target pattern from an image of the evaluation target pattern to output the edge as a first edge;
detecting an edge of a reference pattern from an image of the reference pattern to output the edge as a second edge;
performing a relative scan of the first edge and the second edge to superpose the first edge onto the second edge, and outputting a resulting edge as a third edge;
calculating a characteristic amount indicating characteristics of the third edge from the third edge, and deriving a characteristic amount function which provides the characteristic amount against relative coordinates in the relative scan; and
comparing the characteristic amount function with a preset value to judge whether or not the evaluation target pattern is good.

According to a second aspect of the present invention, there is provided a pattern shape evaluation method comprising:
creating a template for pattern matching from data on an evaluation target pattern and data on a reference pattern;
detecting an edge of the evaluation target pattern from an image of the evaluation target pattern to output the edge as a first edge;
detecting an edge of the reference pattern from an image of the reference pattern to output the edge as a second edge;
matching the first edge with the second edge via the template to superpose the first edge onto the second edge, and outputting a resulting edge as a third edge;
calculating a characteristic amount indicating characteristics of the third edge from the third edge; and
comparing the characteristic amount with a preset value to judge whether or not the evaluation target pattern is good.

According to a third aspect of the present invention, there is provided a program which is contained in a computer-readable medium and which causes a computer to execute a pattern shape evaluation method, the method comprising:
detecting an edge of an evaluation target pattern from an image of the evaluation target pattern to output the edge as a first edge;
detecting an edge of a reference pattern from an image of the reference pattern to output the edge as a second edge;
performing a relative scan of the first edge and the second edge to superpose the first edge onto the second edge, and outputting a resulting edge as a third edge;
calculating a characteristic amount indicating characteristics of the third edge from the third edge, and deriving a characteristic amount function which provides the characteristic amount against relative coordinates in the relative scan; and
comparing the characteristic amount function with a preset value to judge whether or not the evaluation target pattern is good.

According to a fourth aspect of the present invention, there is provided a program which is contained in a computer-readable medium and which causes a computer to execute a pattern shape evaluation method, the method comprising:
creating a template for pattern matching from data on an evaluation target pattern and data on a reference pattern;

detecting an edge of the evaluation target pattern from an image of the evaluation target pattern to output the edge as a first edge;

detecting an edge of the reference pattern from an image of the reference pattern to output the edge as a second edge;

matching the first edge with the second edge via the template to superpose the first edge onto the second edge, and outputting a resulting edge as a third edge;

calculating a characteristic amount indicating characteristics of the third edge from the third edge; and comparing the characteristic amount with a preset value to judge whether or not the evaluation target pattern is good.

According to a fifth aspect of the present invention, there is provided a semiconductor device manufacturing method comprising executing a process of manufacturing a semiconductor device on a semiconductor substrate judged as acceptable by evaluating the shape of an evaluation target pattern formed on the semiconductor substrate, the pattern shape evaluation method including:

detecting an edge of an evaluation target pattern from an image of the evaluation target pattern to output the edge as a first edge;

detecting an edge of a reference pattern from an image of the reference pattern to output the edge as a second edge;

performing a relative scan of the first edge and the second edge to superpose the first edge onto the second edge, and outputting a resulting edge as a third edge;

calculating a characteristic amount indicating characteristics of the third edge from the third edge, and deriving a characteristic amount function which provides the characteristic amount against relative coordinates in the relative scan; and comparing the characteristic amount function with a preset value to judge whether or not the evaluation target pattern is good.

According to a sixth aspect of the present invention, there is provided a semiconductor device manufacturing method comprising executing a process of manufacturing a semiconductor device on a semiconductor substrate judged as acceptable by evaluating the shape of an evaluation target pattern formed on the semiconductor substrate, the pattern shape evaluation method including:

creating a template for pattern matching from data on an evaluation target pattern and data on a reference pattern;

detecting an edge of the evaluation target pattern from an image of the evaluation target pattern to output the edge as a first edge;

detecting an edge of the reference pattern from an image of the reference pattern to output the edge as a second edge;

matching the first edge with the second edge via the template to superpose the first edge onto the second edge, and outputting a resulting edge as a third edge;

calculating a characteristic amount indicating characteristics of the third edge from the third edge; and comparing the characteristic amount with a preset value to judge whether or not the evaluation target pattern is good.

DETAILED DESCRIPTION OF THE INVENTION

Embodiments of the present invention will be described with reference to the drawings. An inspection of the shape of a micropattern formed in semiconductor manufacturing processes such as a photolithographic process and an etching process will be described below by way of example. However, the present invention is not limited to this case, and proposes a pattern shape evaluation method associated with pattern shape inspection processes in general in various other industrial fields, and a program which causes a computer to execute the method.

(1) First Embodiment

In the present embodiment, there will be described, as a concrete example, a case of evaluating a pattern of a semiconductor device formed by stacking a plurality of patterns in layers through a large number of processes. An evaluation target pattern is present in one of the plurality of layers. In the present embodiment, a reference pattern is also present in one of the plurality of layers.

Figure 1:
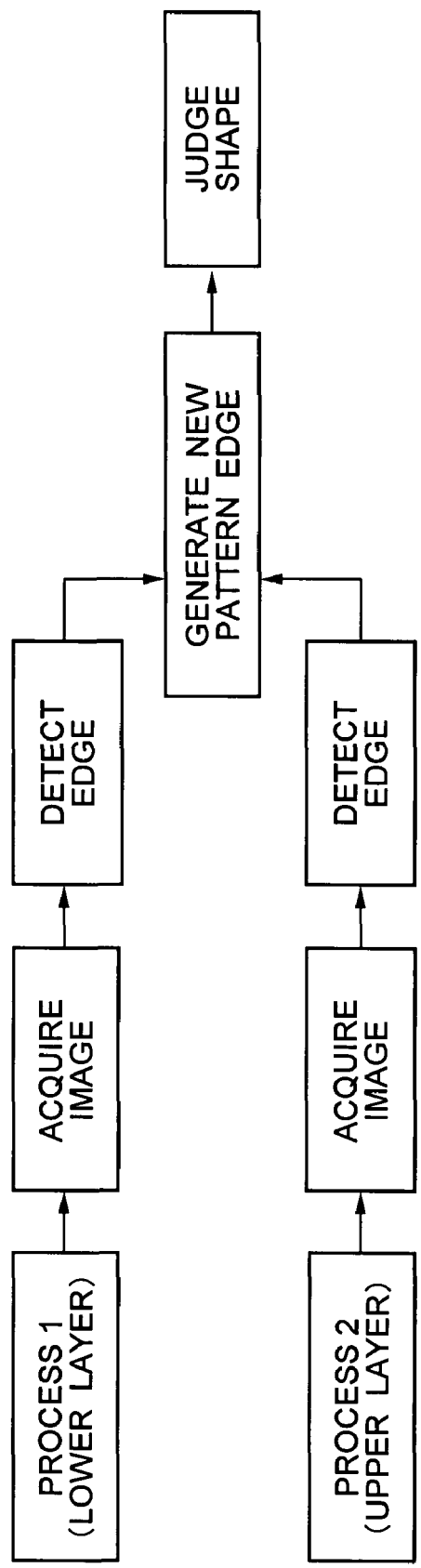
FIGS. 1 and 2 are block charts explaining a pattern shape evaluation method according to a first embodiment of the present invention.
Figure 2:
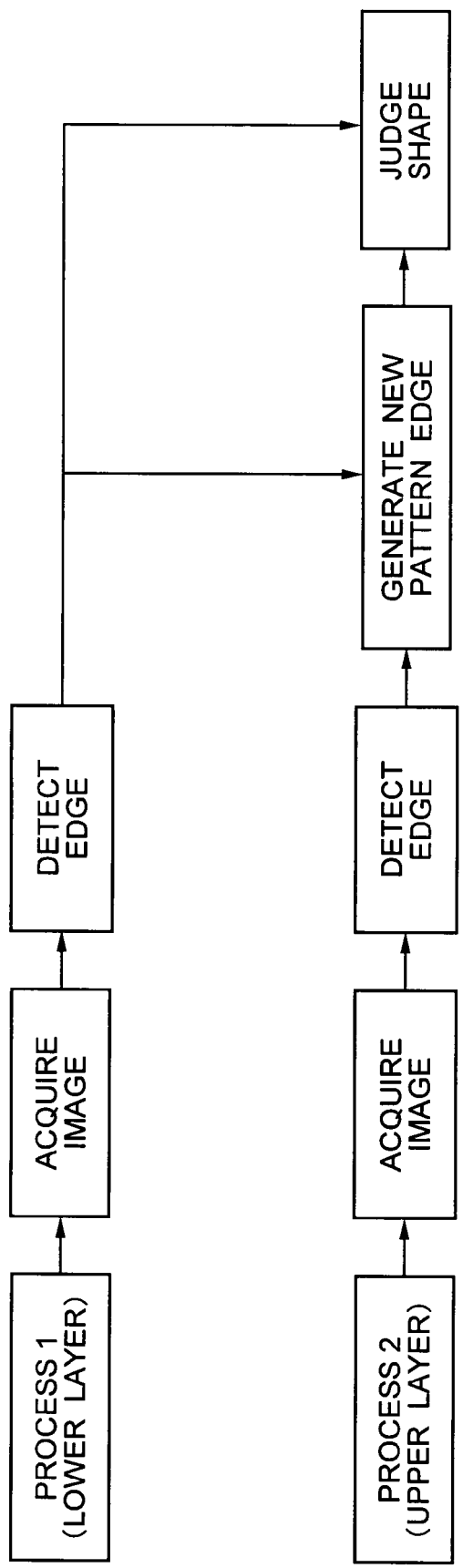

FIGS. 1 and 2 are block charts explaining a pattern shape evaluation method in the present embodiment. FIG. 1 shows a case where the shape of the evaluation target pattern in an upper layer is evaluated with reference to a pattern formed in a lower layer. FIG. 2 shows a case where the shape of the evaluation target pattern in a lower layer is evaluated with reference to a pattern formed in an upper layer. The case shown in FIG. 2 will be described below. In the present embodiment, the evaluation target pattern is a wiring line pattern Pta (see FIG. 3), and the reference pattern is a contact hole pattern Pr1 (see FIG. 4) formed in a layer higher than the wiring line pattern.

Figure 3:
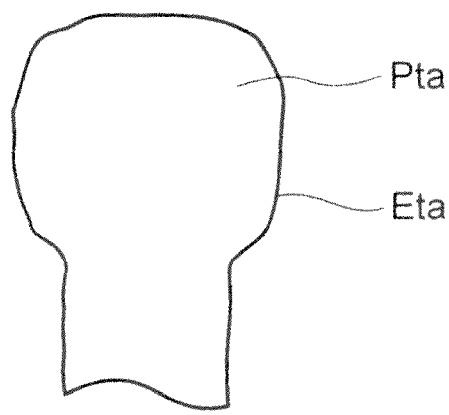
FIG. 3 is a diagram showing one example of the edge of an evaluation target pattern.

First, the wiring line pattern Pta is formed by process 1, and then an image of the wiring line pattern Pta is acquired. The acquired image may be recorded as image data in a storage medium such as a hard disk (not shown), or may be recorded as data on an edge Eta of the wiring line pattern Pta as shown in FIG. 3 after edge detection processing of the image. The edge Eta corresponds to, for example, a first edge.

Figure 4:
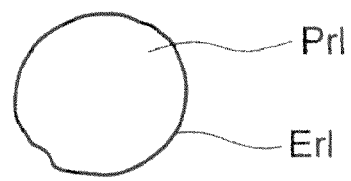
FIG. 4 is a diagram showing one example of the edge of a reference pattern.

After the wiring line pattern Pta is formed, the contact hole pattern Pr1 is further formed in a layer higher than the wiring line pattern Pta by process 2. Next, an image of the contact hole pattern Pr1 is acquired, and this image is subjected to edge detection processing, such that an edge Er1 of the contact hole pattern Pr1 is formed as shown in FIG. 4. This edge Er1 corresponds to, for example, a second edge.

Figure 5:
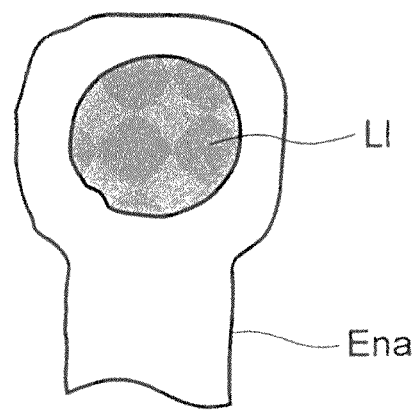
FIG. 5 is a diagram showing a new pattern edge composed of the evaluation target pattern shown in FIG. 3 and the reference pattern shown in FIG. 4, together with the area of a part where the evaluation target pattern and the reference pattern overlap each other.
Figure 6:
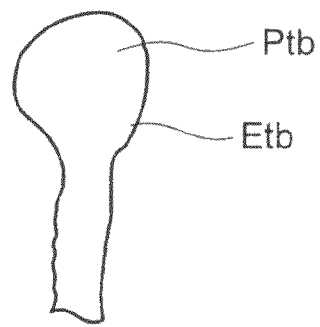
FIG. 6 is a diagram showing another example of the edge of the evaluation target pattern.
Figure 7:
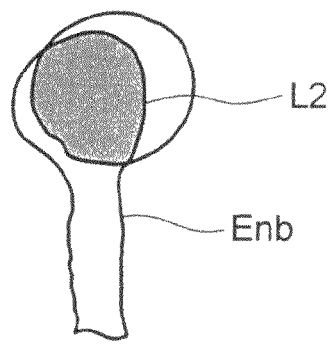
FIG. 7 is a diagram showing a new pattern edge composed of the evaluation target pattern shown in FIG. 6 and the reference pattern shown in FIG. 4, together with the area of a part where the evaluation target pattern and the reference pattern overlap each other.

Next, a new pattern edge Ena shown in FIG. 5 is generated from data on the two edges Eta and Er1 respectively shown in FIG. 3 and FIG. 4, and a part L1 where the wiring line pattern Pta and the contact hole pattern Pr1 overlap each other is detected, and then an area S of the part L1 is calculated. The value of the area S changes depending on the positional relationship between the data on the edges of the two patterns. Thus, in the present embodiment, a relative scan of the wiring line pattern Pta and the contact hole pattern Pr1 is performed to calculate the area S corresponding to all the relative positions. The result of the calculation is expressed as a two-dimensional function which provides an area value against a relative coordinate value. The wiring line pattern Pta is evaluated as acceptable if Sm>C, where Sm is the maximum of the area values within a given coordinate range with regard to the two-dimensional function. Here, C indicates a predetermined area value to be a threshold value as a permissible value for deciding the acceptability of the pattern, and can be set to, for example, 90% of the area value of a region of the contact hole pattern Pr1 enclosed by the edge Er1. In the example shown in FIG. 5, the wiring line pattern Pta is acceptable because there is a positional relationship in which the edge Eta of the wiring line pattern Pta includes the whole region within the edge Er1 of the contact hole pattern Pr1. On the other hand, in the case of an edge Etb of a wiring line pattern Ptb shown in FIG. 6, the wiring line pattern Ptb is unacceptable because a maximum area Sm of an overlap part L2 is 90% or less of the area within the edge Er1 of the contact hole as shown in FIG. 7.

Figure 8:
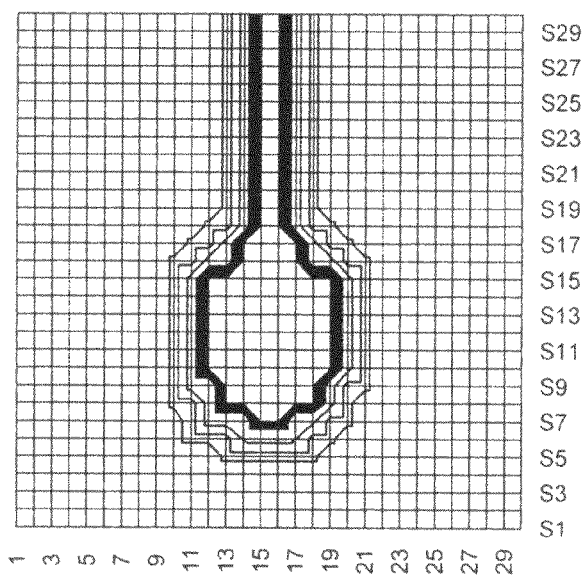
FIG. 8 is a diagram showing an example of a graph of a function of the area of the part where the evaluation target pattern and the reference pattern overlap each other against relative coordinates.

One example of a graph of a two-dimensional function of the area of the overlap part against relative coordinates is shown in FIG. 8. Here, for example, a maximum value may be read as in the present embodiment from the graph of the two-dimensional function as shown in FIG. 8, and compared with a previously provided specification value C to judge the acceptability of the pattern. Alternatively, (the area of) a coordinate range having a value that exceeds a predetermined area value C provided as an area may be compared with a preset specification. In addition, the maximum value Sm of the area S serves as a characteristic amount for judgment in the embodiment described above, but this is not a limitation, and, for example, an average value may be used.

As described above, according to the present embodiment, the new edge data is generated from the edge data for the evaluation target pattern and the edge data for the reference pattern, and the characteristic amount serving as an evaluation index is calculated. Therefore, the shape of the pattern can be evaluated using various values with high accuracy even in the case of a product having a multilayer structure. Moreover, the relative scan of the evaluation target pattern and the reference pattern is performed without carrying out pattern matching, and the area S corresponding to all the relative positions is expressed as the two-dimensional function which provides the area value against the relative coordinate value, such that highly accurate shape evaluation can be achieved with simple computer resources. On the contrary, a predetermined value of the area where the evaluation target pattern and the reference pattern overlap each other by the relative scan is provided in advance as, for example, Ss, and a range of relative coordinate positions satisfying, for example S>Ss is calculated, such that the area Ss can be derived as a specification of misalignment. If compared with the result of a misalignment inspection carried out before the evaluation of the pattern, this specification of the misalignment can be used as an evaluation index of misalignment.

(2) Second Embodiment

In the present embodiment, a case will be described where a positional relationship between an evaluation target pattern and a reference pattern is determined by pattern matching before the calculation of a characteristic amount for pattern evaluation.

Figure 9:
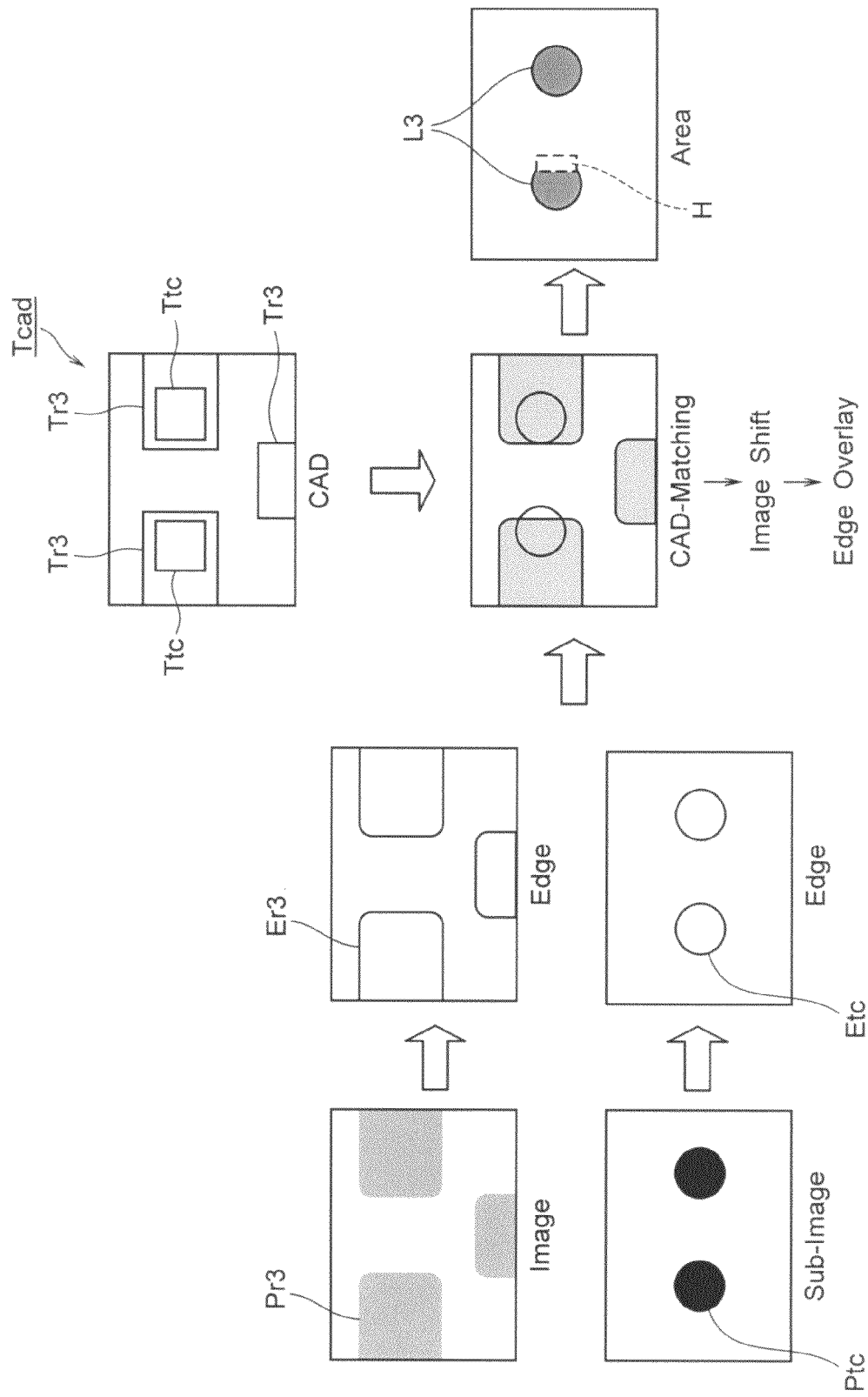
FIG. 9 is a block chart explaining a pattern shape evaluation method according to a second embodiment of the present invention.

FIG. 9 is a block chart explaining a pattern shape evaluation method according to the present embodiment. The present embodiment is characterized in that a pattern Pr3 different from an evaluation target pattern Ptc is used as the reference pattern. In FIG. 9, images of the patterns Ptc and Pr3 are obtained by a unit such as an SEM from regions of the same coordinates within a semiconductor device, and these patterns are positioned relative to each other in an upper layer and a lower layer respectively, in the same manner as, for example, a wiring line pattern and a hole pattern. In the present embodiment, the pattern Ptc is assumed as the wiring line pattern, and the pattern Pr3 is assumed as the hole pattern.

Furthermore, design data Tcad for the patterns Ptc and Pr3 is prepared as a template for matching. The design data is generally formed in a binary format called GDS. The present embodiment needs at least design data including layers corresponding to the respective patterns in the vicinity of these patterns. Here, the design data for the layer of the wiring line pattern Ptc is Ttc, and the design data for the layer of the hole pattern Pr3 is Tr3. Therefore, in the example shown in FIG. 9, the template Tcad is composed of the template Ttc and the template Tr3.

First, an image of the evaluation target pattern Ptc and an image of the reference pattern Pr3 are acquired, from which edges are detected, thereby obtaining data on an edge Etc and data on an edge Er3. Then, the edge Etc of the evaluation target pattern Ptc is aligned with the corresponding template Ttc. In the same manner, the edge Er3 of the reference pattern Pr3 is aligned with the corresponding template Tr3. Here, since the positional relationship between the template Ttc and the template Tr3 is predetermined as part of the design data, the edge Etc of the evaluation target pattern Ptc can be superposed on the edge Er3 of the reference pattern Pr3 in the same coordinate system in accordance with the results of the two alignments described above. An area S of a part L3 where the evaluation target pattern Ptc and the reference pattern Pr3 overlap each other is calculated from the result of the above superposition, and the area S is compared with a previously provided specification value C to quantitatively judge the acceptability of the evaluation pattern Ptc. In the example shown in FIG. 9, a portion of the evaluation pattern Ptc indicated by a sign H extends out of the reference pattern Pr3, so that a value smaller for the area of the portion H than the area of the hole pattern Ptc is calculated as the value of S. A defect in the evaluation pattern Ptc can be quantitatively judged in accordance with such a procedure. A correlative positional difference is found in an actual semiconductor manufacturing process, so that, for example, a misalignment inspection unit (not shown) is used to previously measure a positional difference produced in the actual pattern manufacture, and a correction is made using the measurement value, thereby enabling more accurate judgment.

Thus, according to the present embodiment, the pattern can be highly accurately and quantitatively evaluated. Moreover, when the reference pattern is examined by another method such as CD measurement, the result of the examination is contrasted with the area S obtained by the present embodiment, so that the method of the present embodiment can also be used as a misalignment inspection method.

While the example using the reference pattern Pr3 has been described in the present embodiment, the reference pattern as such is not always needed. If the design data Tr3 corresponding to the reference pattern is provided, a drawn line of the pattern of the design data Tr3 is superposed on Etc which is the edge of the evaluation pattern Ptc, and the area of the overlapping part is similarly calculated, thereby allowing the evaluation of the evaluation pattern Ptc. In this case, the edge of the pattern may be derived from the drawn line of the design data Tr3, or the edge may be derived from a drawn line subjected to CAD processing including, for example, the rounding of corners of the pattern.

(3) Program

A series of procedures of the pattern shape evaluation method described above may be incorporated in a program to be executed by a computer, contained in a recording medium such as a flexible disk or a CD-ROM, and read into and executed by the computer. This makes it possible to achieve the pattern shape evaluation method according to the present invention by use of a general-purpose computer. The recording medium is not limited to a portable medium such as a magnetic disk or an optical disk, and may be a fixed recording medium such as a hard disk drive or a memory. Further, the program incorporating the series of procedures of the pattern shape evaluation method described above may be distributed via a communication line (including wireless communication) such as the Internet. Moreover, the program incorporating the series of procedures of the pattern shape evaluation method described above may be distributed in an encrypted, modulated or compressed state via a wired line such as the Internet or a wireless line or in a manner contained in a recording medium.

(4) Semiconductor Device Manufacturing Method

When the pattern shape evaluation method described above is incorporated in a process of manufacturing a semiconductor device, the semiconductor device can be manufactured at high yield.

More specifically, a semiconductor substrate is extracted per production lot, and the shape of a pattern formed on the extracted semiconductor substrate is detected by the pattern shape evaluation method described above. When the semiconductor substrate is judged as acceptable as a result of the evaluation, the rest of the manufacturing process is continuously executed for the whole production lot to which the evaluated semiconductor substrate belongs. On the other hand, when the semiconductor substrate exceeds a threshold value set in accordance with product specifications and is judged as unacceptable as a result of the evaluation but can be reworked, rework processing is executed for the production lot to which the semiconductor substrate judged as unacceptable belongs. When the rework processing is finished, the semiconductor substrate is extracted from the production lot, and the shape is again evaluated. If the pattern on the extracted semiconductor substrate is judged as acceptable as a result of the reevaluation, the rest of the manufacturing process is executed for the production lot finished with the rework processing. In addition, when the rework processing is impossible, the production lot to which the semiconductor substrate having the pattern judged as unacceptable belongs is disposed of. When the cause of the defect can be analyzed, results of the analysis are fed back to a person in charge of designing, a person in charge of an upstream process or the like.

While some of the embodiments of the present invention have been described above, it should be understood that the present invention is not limited to the embodiments described above, and can be modified in various manners within the technical scope thereof and carried out. Moreover, the data on the image of the actually created pattern has been described as the reference pattern in the first embodiment and the CAD data has been described by way of example in the second embodiment, but the present invention is not limited thereto, and, for example, data resulting from a simulation may be used.

What is claimed is:

1. A pattern shape evaluation method comprising:
   detecting an edge of an evaluation target pattern from an image of the evaluation target pattern to output the edge as a first edge, the evaluation target pattern being formed in a first layer of a device comprising a structure with a plurality of layers;
   detecting an edge of a reference pattern from an image of the reference pattern to output the edge as a second edge, the reference pattern being formed in a second layer of the device, the second layer being different from the first layer;
   superposing the first edge onto the second edge to output a resulting edge as a third edge;
   calculating a characteristic amount of the third edge;
   positioning the first edge and second edge at a plurality of relative positions and performing a relative scan of the first edge and the second edge at each relative position to derive a characteristic amount function, wherein the characteristic amount function specifies characteristic amounts at respective relative positions; and
   comparing the characteristic amount function with a preset value to judge whether or not the evaluation target pattern is good.

2. The pattern shape evaluation method according to claim 1,
   wherein each characteristic amount is the area of a part common to the evaluation pattern and the reference pattern at the corresponding relative position.

3. The pattern shape evaluation method according to claim 1,
   wherein the second layer is lower than the first layer.

4. The pattern shape evaluation method according to claim 1,
   wherein the second layer is higher than the first layer.

5. A pattern shape evaluation method comprising:
   creating a template for pattern matching from data on an evaluation target pattern in a first layer of a device comprising a structure with plurality of layers, and data on a reference pattern in a second layer of the device, the second layer being different from the first layer;
   detecting an edge of the evaluation target pattern from an image of the evaluation target pattern to output the edge as a first edge;
   detecting an edge of the reference pattern from an image of the reference pattern to output the edge as a second edge;
   matching the first edge with the second edge via the template to superpose the first edge onto the second edge, and outputting a resulting edge as a third edge;
   calculating a characteristic amount function from the third edge, the characteristic amount function providing characteristic amounts of an overlapping part of the target pattern and the reference pattern at a plurality of relative positions between the first edge and the second edge; and
   comparing the characteristic amount function with a preset value to judge whether or not the evaluation target pattern is good.

6. A non-transitory computer-readable recording medium containing a program which causes a computer to execute a pattern shape evaluation, the pattern shape evaluation comprising:
- detecting an edge of an evaluation target pattern from an image of the evaluation target pattern to output the edge as a first edge the evaluation target pattern being formed in a first layer of a device comprising a structure with a plurality of layers;
- detecting an edge of a reference pattern from an image of the reference pattern to output the edge as a second edge, the reference pattern being formed in a second layer of the device, the second layer being different from the first layer;
- superposing the first edge onto the second edge to output a resulting edge as a third edge;
- calculating a characteristic amount of the third edge;
- positioning the first edge and second edge at a plurality of relative positions and performing a relative scan of the first edge and the second edge at each relative position to derive a characteristic amount function, wherein the characteristic amount function specifies characteristic amounts at respective relative positions; and
- comparing the characteristic amount function with a preset value to judge whether or not the evaluation target pattern is good.

7. The medium according to claim 6,
wherein each characteristic amount is the area of a part common to the evaluation pattern and the reference pattern at the corresponding relative position.

8. The medium according to claim 6,
wherein the second layer is lower than the first layer.

9. The medium according to claim 6,
wherein the second layer is higher than the first layer.

10. A non-transitory computer-readable recording medium containing a program which causes a computer to execute a pattern shape evaluation, the pattern shape evaluation comprising:
- creating a template for pattern matching from data on an evaluation target pattern in a first layer of a device comprising a structure with a plurality of layers, and data on a reference pattern in a second layer of the device, the second layer being different from the first layer;
- detecting an edge of the evaluation target pattern from an image of the evaluation target pattern to output the edge as a first edge;
- detecting an edge of the reference pattern from an image of the reference pattern to output the edge as a second edge;
- matching the first edge with the second edge via the template to superpose the first edge onto the second edge, and outputting a resulting edge as a third edge;
- calculating a characteristic amount function from the third edge, the characteristic amount function providing characteristic amounts of an overlapping part of the target pattern and the reference pattern at a plurality of relative positions between the first edge and the second edge; and
- comparing the characteristic amount function with a preset value to judge whether or not the evaluation target pattern is good.

11. A semiconductor device manufacturing method comprising executing a process of manufacturing a semiconductor device on a semiconductor substrate judged as acceptable by evaluating the shape of an evaluation target pattern formed on the semiconductor substrate, the pattern shape evaluation method comprising:
- detecting an edge of an evaluation target pattern from an image of the evaluation target pattern to output the edge as a first edge, the evaluation target pattern being formed in a first layer of a semiconductor substrate comprising a plurality of layers;
- detecting an edge of a reference pattern from an image of the reference pattern to output the edge as a second edge, the reference pattern being formed in a second layer of the semiconductor substrate, the second layer being different from the first layer;
- superposing the first edge onto the second edge to output a resulting edge as a third edge;
- calculating a characteristic amount of the third edge;
- positioning the first edge and second edge at a plurality of relative positions and performing a relative scan of the first edge and the second edge at each relative position to derive a characteristic amount function, wherein the characteristic amount function specifies characteristic amounts at respective relative positions; and
- comparing the characteristic amount function with a preset value to judge whether or not the evaluation target pattern is good.

12. The semiconductor device manufacturing method according to claim 11,
wherein each characteristic amount is the area of a part common to the evaluation pattern and the reference pattern at the corresponding relative position.

13. The semiconductor device manufacturing method according to claim 11,
wherein the second layer is lower than the first layer.

14. The semiconductor device manufacturing method according to claim 11,
wherein the second layer is higher than the first layer.

15. A semiconductor device manufacturing method comprising executing a process of manufacturing a semiconductor device on a semiconductor substrate judged as acceptable by evaluating the shape of an evaluation target pattern formed on the semiconductor substrate, the pattern shape evaluation method comprising:
- creating a template for pattern matching from data on an evaluation target pattern in a first layer of a semiconductor substrate comprising a structure with a plurality of layers, and data on a reference pattern in a second layer of the device, the second layer being different from the first layer;
- detecting an edge of the evaluation target pattern from an image of the evaluation target pattern to output the edge as a first edge;
- detecting an edge of the reference pattern from an image of the reference pattern to output the edge as a second edge;
- matching the first edge with the second edge via the template to superpose the first edge onto the second edge, and outputting a resulting edge as a third edge;
- calculating a characteristic amount function from the third edge, the characteristic amount function providing characteristic amounts of an overlapping part of the target pattern and the reference pattern at a plurality of relative positions between the first edge and the second edge; and
- comparing the characteristic amount function with a preset value to judge whether or not the evaluation target pattern is good.

* * * * *